United States Patent [19]

MacKenzie

[11] 4,440,791

[45] Apr. 3, 1984

[54] CULTURED EGG-MILK PRODUCT

[75] Inventor: Kenneth A. MacKenzie, Stretton, Australia

[73] Assignee: The Egg Marketing Board, South Queensland, Australia

[21] Appl. No.: 378,776

[22] Filed: May 17, 1982

[30] Foreign Application Priority Data

Mar. 11, 1982 [AU] Australia ............................... PF3054

[51] Int. Cl.³ ................................................. A23C 9/13
[52] U.S. Cl. ....................................... 426/43; 426/34; 426/40; 426/47; 426/583
[58] Field of Search ....................... 426/34, 40, 43, 47, 426/583

[56] References Cited

U.S. PATENT DOCUMENTS

| | | | |
|---|---|---|---|
| 1,101,044 | 6/1914 | Thoumaian | 426/43 |
| 3,563,760 | 2/1971 | Kuwabara et al. | 426/43 |
| 3,737,326 | 6/1973 | Basso | 426/583 |
| 4,163,802 | 8/1979 | Redfern et al. | 426/43 |
| 4,210,672 | 7/1980 | Hata | 426/43 |
| 4,216,243 | 8/1980 | Hermann | 426/583 |

FOREIGN PATENT DOCUMENTS 1556987  6/1980  United Kingdom .

Primary Examiner—David M. Naff
Assistant Examiner—Marianne S. Minnick
Attorney, Agent, or Firm—Wood, Dalton, Phillips, Mason & Rowe

[57]  ABSTRACT

A cultured egg-milk product is formed by combining whole or skim milk, skim milk powder, sugar and liquid, whole or powdered egg, adding selected bacterial cultures such as $LB_1$ strain of *Lactobacillus bulgaricus* and $TS_2$ strain of *Streptococcus thermophilus*, and fermenting until a predetermined degree of bacterial growth has been achieved to produce a cultured egg-milk product having desired qualities of texture and taste.

15 Claims, No Drawings

CULTURED EGG-MILK PRODUCT

This invention relates to a food product and in particular to a cultured egg-milk product, and a method of producing such a product.

Yoghurt is a milk product which is very popular and which can now be bought off the shelf in many different forms, for example as flavoured yoghurt, frozen yoghurt, skimmed milk yoghurt or full cream milk yoghurt. The basic appeal of yoghurt is as a health food which is high in protein. Yoghurt is made by combining milk with specific lactic acid bacteria and then souring it under defined conditions. More particulary, lactic acid fermentation occurs during the action of bacteria such as *Lactobacillus bulgaricus* and *Streptococcus thermophilus* on milk or milk products such as pasteurised milk or concentrated milk with or without optional additives such as milk powder, skim milk powder, whey powder etc.

The present invention aims to provide a new food product which is an alternative to a yoghurt product. The present invention also provides a method of manufacture of such a product. The food product made in accordance with the method of the present invention has an appealing taste, texture and aesthetic appearance and is high in protein. Other objects and advantages of the invention will become apparent hereunder.

With the above and other objects in view, this invention resides broadly in a method of producing a cultured egg-milk product, said method comprising:

(1) forming a composition of whole or skim milk, skim milk powder, sugar and liquid, whole or powdered egg;

(2) adding selected bacterial cultures to said composition to cause fermentation thereof, said composition being fermented until a predetermined degree of bacterial growth has been achieved.

The invention also resides in the cultured egg-milk product formed by the above method.

Preferably the pre-fermentation composition is formed by combining the separate components thereof in a particular manner and in accordance with specific temperature conditions. Preferably also, a stabilizer is added to the pre-fermentation composition so as to provide the product with a firmer body.

A composition suitable for use in a method of the present invention preferably comprises from 65 to 85% by weight of whole milk, up to 20% by weight of liquid whole egg (or equivalent liquid powdered egg), 4 to 8% by weight of skim milk powder, 2 to 10% by weight of sugar and 0.1 to 1% by weight of stabilizer.

A particular preferred composition which yields a product having the desired qualities of taste, texture and aesthetic appearance comprises the following components by weight:

Liquid whole egg (or equivalent powdered egg): 15% by weight
Skim milk powder: 6% by weight
Sugar: 4% by weight
Stabilizer: 0.2% by weight
Milk: 74.8% by weight In a typical 12 kgm sample composition, the following quantities of the individual components used in accordance with the above percentages are:

Liquid whole egg: 1.8 Kgm
Skim milk powder: 0.72 Kgm
Sugar: 0.48 Kgm
Stabilizer: 24 grams
Milk: 8.97 Kgm Preferably the milk is 3% butter fat milk. The astabilizer may be of any suitable type such as that sold under the trade mark "Starite" which is a mixture of hydrocolloid gums. It has been found by tests that the most desirable end product is achieved by limiting the egg contant in the composition to approximately 15% by weight. The sugar used in the above composition is white cane sugar or sucrose however it will be realized that alternate sugars such as saccharose, galactose or other sugar may be used in amounts to provide the required sugar content set out above.

Preferably the above described pre-fermentation composition is formed in the following manner prior to the introduction of selected bacteria:

The milk is first heated to approximately 50° C. and the skim milk powder, sugar and stabilizer are then added to the heated milk and dissolved therein by agitation. The resultant mixture is then homogenized at approximately 2500 p.s.i. After homogenization, the mixture is heated to approximately 85° C. for at least thirty minutes and then cooled to approximately 45° C. at which it is then held. The egg is added to the mixture and stirred thereinto during this cooling period and preferably after the temperature thereof drops below 70° C. Selected bacterial starters are then added to the resultant composition to start the fermentation process. Preferably the starter cultures are $LB_1$ strain of *Lactobacillus bulgaricus* and $TS_2$ strain of *Streptococcus thermophilus*. Preferably also, the quantities of such cultures added to the composition are:

3.33% by weight of $LB_1$ strain of *Lactobacillus bulgaricus* and 1.66% by weight of $TS_2$ strain of *Streptococcus thermophilus*.

The mixture is then incubated at approximately 45° C. to allow bacterial growth. The pH level is monitored during this fermentation period until it is in the region of 4.9 to 5.0 after which the product is cooled to approximately 4° C. The final pH of the product depends on the rate of cooling and should be in the range of pH 4.0 to pH 4.2.

To increase the consumer appeal of the product, any desired flavours may be added after the cooling process.

It will be seen from the above that the present invention provides a method for producing a new food product incorporating egg in the starting composition and wherein the egg undergoes fermentation. Furthermore, the method of the present invention provides a food product which is at least an alternative to yoghurt.

Whilst the above has been given by way of illustrative example of the present invention, all such modifications and variations as would be apparent to persons skilled in the art are deemed to fall within the broad scope and ambit of the invention as is defined in the appended claims.

I claim:

1. A method of producing a cultured egg milk product from whole or skim milk, skim milk powder, sugar and liquid whole egg or powdered whole egg in liquid form comprising the steps of heating said milk and dissolving said skim milk powder and sugar therein to form a first mixture; homogenizing said first mixture, subsequently heating said first mixture and maintaining said first mixture at an elevated temperature; cooling said first mixture and adding said egg to form a second mixture; adding bacterial cultures to said second mixture, said bacterial cultures being selected to cause fermentation of said second mixture, and incubating said second mixture until a predetermined degree of bacterial growth has been achieved.

2. A method according to claim 1 wherein said homogenized first mixture is heated to approximately 85° C. and maintained at that temperature for at least 30 minutes and wherein said egg is added to said first mixture after said first mixture is cooled to a temperature below 70° C.

3. A method according to claim 1 wherein said bacterial cultures comprise $LB_1$ strain of *Lactobacillus bulgaricus* and $TS_2$ strain of *Streptococcus thermophilus*.

4. A method of producing a cultured egg milk product comprising the steps of combining 65% to 85% by weight of whole or skim milk, 4% to 8% by weight of skim milk powder and 2% to 10% by weight of sugar to form a first combination, heating said first combination, subsequently cooling said first combination and adding up to 20% by weight of liquid whole egg or powdered whole egg in liquid form to form a second combination, adding bacterial cultures to said second combination, said bacterial cultures being selected to cause fermentation of said second combination, and incubating said second combination until a predetermined degree of bacterial growth has been achieved.

5. A method according to claim 4 wherein said milk, skim milk powder and sugar combination is homogenized prior to the addition of said egg.

6. A method according to claim 5 wherein said homogenized combination is heated to approximately 85° C. and maintained at that temperature for at least 30 minutes, said homogenized combination being subsequently cooled and said egg being added to said homogenized combination after the temperature thereof drops below 70° C.

7. A method according to claim 4 wherein said bacterial cultures comprise $LB_1$ strain of *Lactobacillus bulgaricus* and $TS_2$ strain of *Streptococcus thermophilus*.

8. A method of producing a cultured egg milk product comprising the steps of heating 65% to 85% by weight of whole or skim milk, dissolving 4 to 8% by weight of skim milk powder and 2 to 10% by weight of sugar in said heated milk to form a first mixture, homogenizing said first mixture and subsequently heating said first mixture to approximately 85° C. and maintaining said first mixture at said temperature for at least 30 minutes; subsequently cooling said first mixture and adding to said first mixture during said cooling up to 20% by weight of liquid whole egg or powdered whole egg in liquid form to form a second mixture, adding bacterial cultures to said second mixture, said bacterial cultures being selected to cause fermentation of said second mixture, and incubating said second mixture until a predetermined degree of bacterial growth has been achieved.

9. A method according to claim 8 wherein said incubation is continued until the pH of said fermenting second mixture is in the range of 4.9 to 5.0 and wherein said second mixture is subsequently cooled until the pH is in the range of 4.0 to 4.2.

10. A method according to claim 8 wherein said second mixture comprises 74.8% by weight of milk, 6% by weight of skim milk powder, 4% by weight of sugar and 15% by weight of said egg.

11. A method according to claim 10 wherein said bacterial cultures comprise 3.33% by weight of $LB_1$ strain of *Lactabacillus bulgaricus* and 1.66% by weight of $TS_2$ strain of *Streptococcus thermophilus*.

12. A method according to claim 8 wherein said egg is added to said first mixture after the temperature thereof drops below 70° C.

13. A cultured egg-milk product produced by the method of claim 1.

14. A cultured egg-milk product produced by the method of claim 4.

15. A cultured egg-milk product produced by the method of claim 8.

* * * * *